US012646649B2

(12) United States Patent
Miura et al.

(10) Patent No.: US 12,646,649 B2
(45) Date of Patent: Jun. 2, 2026

(54) COIL COMPONENT

(71) Applicant: TDK Corporation, Tokyo (JP)

(72) Inventors: Mitsuru Miura, Tokyo (JP); Toshiyuki Abe, Tokyo (JP); Tomonaga Nishikawa, Tokyo (JP); Masaki Endo, Tokyo (JP); Masaki Yoneyama, Tokyo (JP)

(73) Assignee: TDK Corporation, Tokyo (JP)

( * ) Notice: Subject to any disclaimer, the term of this patent is extended or adjusted under 35 U.S.C. 154(b) by 805 days.

(21) Appl. No.: 17/972,031

(22) Filed: Oct. 24, 2022

(65) Prior Publication Data

US 2023/0137323 A1 May 4, 2023

(30) Foreign Application Priority Data

Oct. 28, 2021 (JP) ................................ 2021-176577

(51) Int. Cl.

| | |
|---|---|
| ***H01F 5/00*** | (2006.01) |
| ***H01F 5/04*** | (2006.01) |
| ***H01F 5/06*** | (2006.01) |
| ***H01F 27/32*** | (2006.01) |

(52) U.S. Cl.

CPC ............ *H01F 27/323* (2013.01); *H01F 5/04* (2013.01); *H01F 5/06* (2013.01)

(58) Field of Classification Search

CPC .................................................... H01F 27/323
USPC ......................................................... 336/200
See application file for complete search history.

(56) References Cited

FOREIGN PATENT DOCUMENTS

JP 2020-088330 A 6/2020

OTHER PUBLICATIONS

English translation of JP2020088330 (Year: 2020).*

* cited by examiner

*Primary Examiner* — Ronald Hinson
(74) *Attorney, Agent, or Firm* — Rimon P.C.

(57) ABSTRACT

Disclosed herein is a coil component that includes a first conductor layer, one or more third conductor layers, and a second conductor layer stacked one another in this order. One end of the coil pattern in the first conductor layer is connected to first terminal patterns in the second and third conductor layers. The first terminal pattern in the second conductor layer is connected to a first terminal electrode. One end of the coil pattern in the second conductor layer is connected to a second terminal electrode. The width in a radial direction of the first terminal pattern positioned in the third conductor layer is larger than the width in the radial direction of the second terminal pattern positioned in the third conductor layer.

20 Claims, 4 Drawing Sheets

COIL COMPONENT

CROSS-REFERENCE TO RELATED APPLICATIONS

The disclosure of Japanese Patent Application No. 2021-176577 filed on Oct. 28, 2021 including the specification, drawings and abstract is incorporated herein by reference in its entirety.

BACKGROUND OF THE ART

Field of the Art

The present disclosure relates to a coil component and, more particularly, to a coil component having a structure in which a plurality of interlayer insulating films and a plurality of conductor layers are alternately stacked.

Description of Related Art

JP 2020-088330A discloses a coil component having a structure in which a plurality of interlayer insulating films and a plurality of conductor layers are alternately stacked. In the coil component described in JP 2020-088330A, two terminal electrodes are arranged in the stacking direction of the plurality of conductor layers, one of which is connected to one end of a coil pattern positioned in the lowermost layer, and the other one of which is connected to one end of a coil pattern positioned in the uppermost layer.

In the coil component described in JP 2020-088330A, however, one of the two terminal electrodes is connected to a coil pattern positioned in the lowermost layer as described above and has thus a higher connection resistance than the other one thereof.

SUMMARY

It is therefore an object of the present disclosure to reduce a difference between a connection resistance between one terminal electrode and its corresponding coil pattern and a connection resistance between the other terminal electrode and its corresponding coil pattern.

A coil component according to the present disclosure includes: a coil part in which a plurality of interlayer insulating films and a plurality of conductor layers each having a coil pattern are alternately stacked; and first and second terminal electrodes stacked on the coil part. The plurality of conductor layers includes: a first conductor layer positioned in the lowermost layer; a second conductor layer positioned in the uppermost layer; and one or more third conductor layers positioned between the first and second conductor layers. The second and third conductor layers each include a first terminal pattern overlapping one end of the coil pattern positioned in the first conductor layer and the first terminal electrode. The first and third conductor layers each include a second terminal pattern overlapping one end of the coil pattern positioned in the second conductor layer and the second terminal electrode. The one end of the coil pattern positioned in the first conductor layer and the first terminal patterns positioned in the respective second and third conductor layers are connected to one another through via conductors penetrating the interlayer insulating films. The first terminal pattern positioned in the second conductor layer and the first terminal electrode are connected to each other through a via conductor penetrating the interlayer insulating film. The one end of the coil pattern positioned in the second conductor layer and the second terminal electrode are connected to each other through a via conductor penetrating the interlayer insulating film. The width in the radial direction of the first terminal pattern positioned in the third conductor layer is larger than the width in the radial direction of the second terminal pattern positioned in the third conductor layer.

BRIEF DESCRIPTION OF THE DRAWINGS

The above features and advantages of the present disclosure will be more apparent from the following description of certain embodiments taken in conjunction with the accompanying drawings, in which.

DETAILED DESCRIPTION OF THE EMBODIMENTS

Some embodiments of the present disclosure will be explained below in detail with reference to the accompanying drawings.

Figure 1:
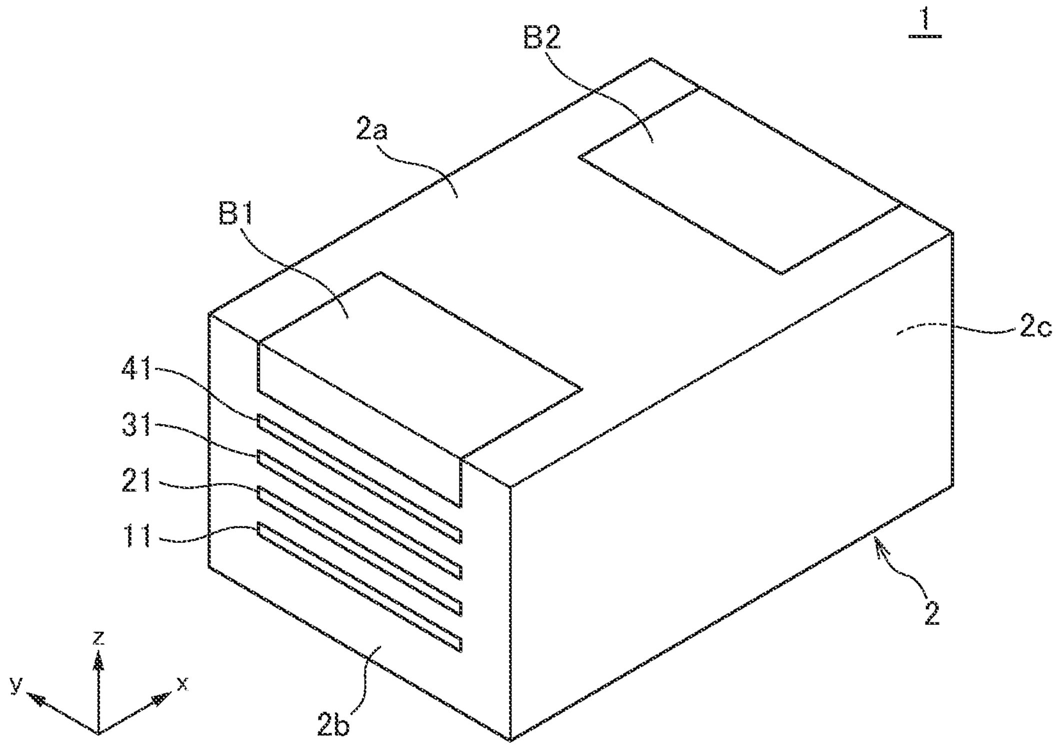
FIG. 1 is a schematic perspective view illustrating the outer appearance of a coil component 1 according to an embodiment of the present disclosure.
Figure 2:
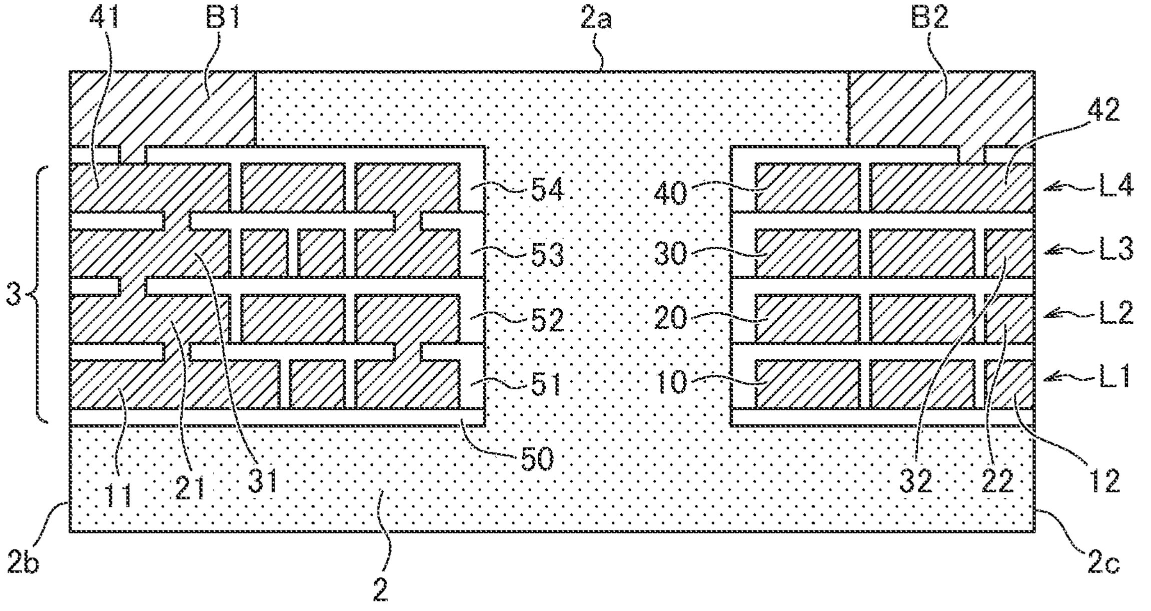
FIG. 2 is a schematic cross-sectional view of the coil component 1.

FIG. 1 is a schematic perspective view illustrating the outer appearance of a coil component 1 according to an embodiment of the present disclosure. FIG. 2 is a schematic cross-sectional view of the coil component 1.

As illustrated in FIGS. 1 and 2, the coil component 1 according to the present embodiment includes a magnetic element member 2, a coil part 3, and bump terminal electrodes B1 and B2. The coil part 3 and bump terminal electrodes B1 and B2 are embedded in the magnetic element member 2. The magnetic element member 2 is positioned in the inner diameter area of the coil part 3 and is also positioned in the outside area of the coil part 3 so as to sandwich the coil part 3 in the z-direction (coil axis direction). The magnetic element member 2 is a composite magnetic member containing magnetic metal filler made of iron (Fe) or a permalloy-based material and a resin binder and forms a magnetic path for magnetic flux generated by a current flowing in the coil part 3. The magnetic element member 2 has an upper surface 2*a* constituting the xy plane which is perpendicular to the z-direction (coil axis direction) and a pair of side surfaces 2*b* and 2*c* constituting the yz plane which is perpendicular to the upper surface 2*a*. The surface of the terminal electrode B1 is exposed from the upper surface 2*a* and side surface 2*b* of the magnetic element member 2. The surface of the terminal electrode B2 is exposed from the upper surface 2*a* and side surface 2*c* of the magnetic element member 2. Upon mounting of the coil component 1, the terminal electrodes B1 and B2 are soldered onto a circuit board such that the upper surface 2*a* of the magnetic element member 2 faces the circuit board.

The coil part 3 includes interlayer insulating films 50 to 54 and conductor layers L1 to L4 which are alternately stacked in the coil axis direction. The conductor layers L1 to L4 have coil patterns 10, 20, 30, and 40, respectively.

FIGS. 3 to 6 are plan views illustrating the conductor layers L1 to L4, respectively.

Figure 3:
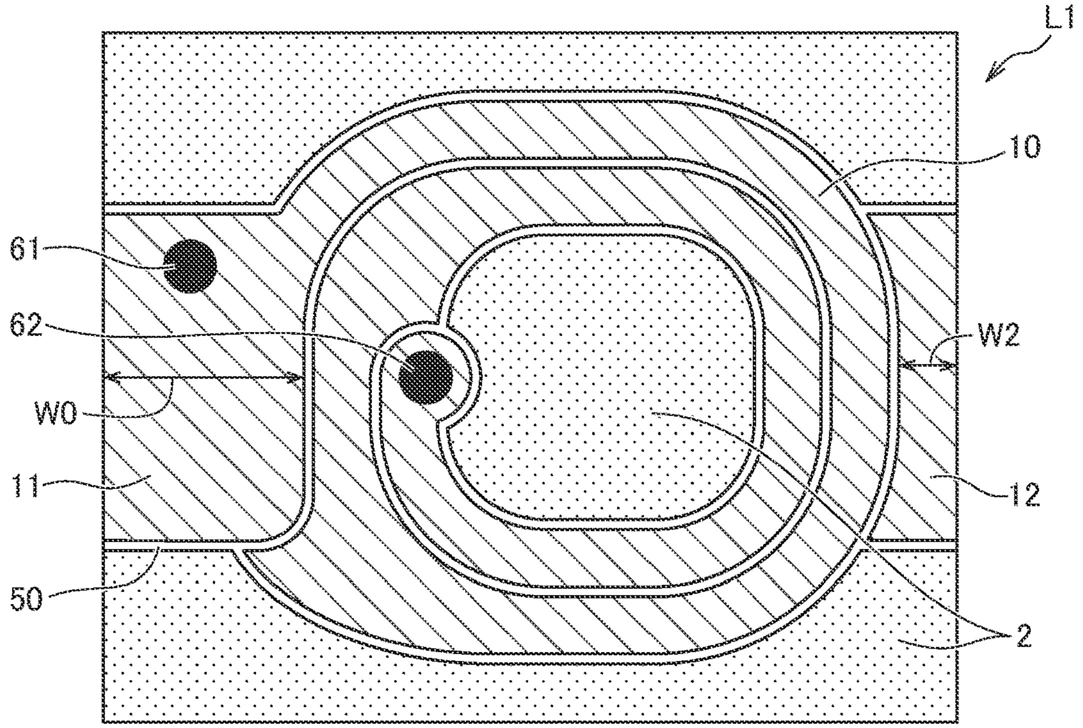
FIG. 3 is a plan view illustrating the conductor layer L1.

As illustrated in FIG. 3, the conductor layer L1 is formed on the surface of the interlayer insulating film 50 and includes the coil pattern 10 and a terminal pattern 12. An outer peripheral end 11 of the coil pattern 10 has an enlarged area and overlaps the terminal electrode B1 as viewed in the z-direction. The terminal pattern 12 is separated from the coil pattern 10 within the surface and overlaps the terminal electrode B2 as viewed in the z-direction. The width in the x-direction of the outer peripheral end 11 of the coil pattern 10 is W0, and the width of the terminal pattern 12 in the x-direction is W2. The width W0 is larger than the width W2. The thus configured conductor layer L1 is covered with the interlayer insulating film 51.

Figure 4:
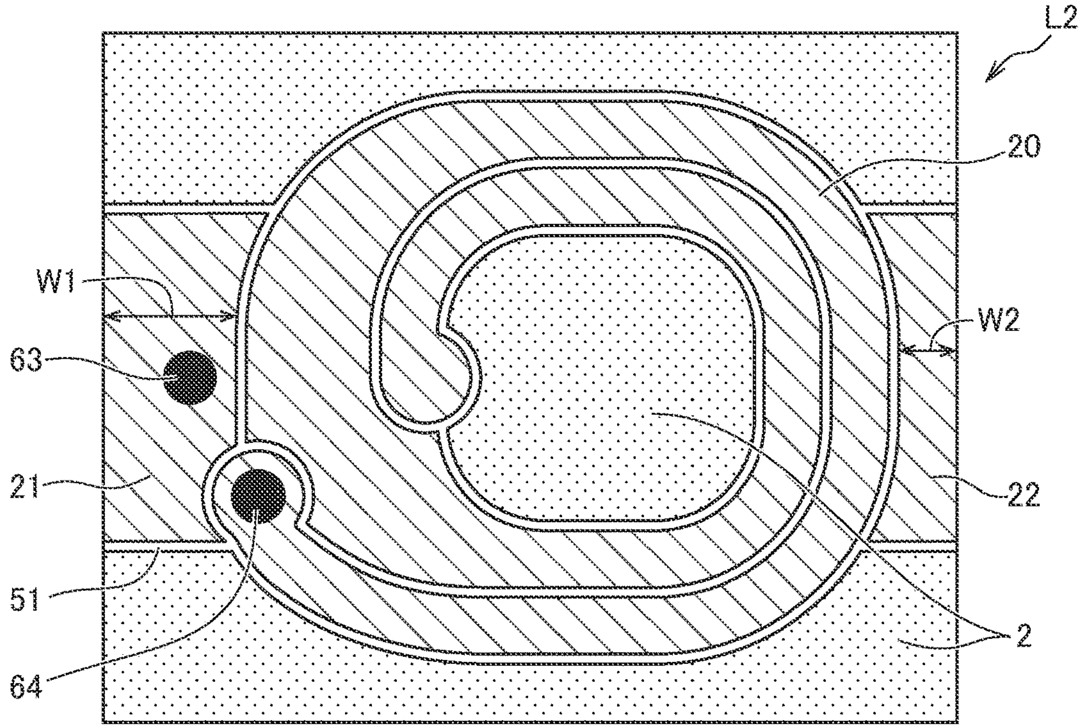
FIG. 4 is a plan view illustrating the conductor layer L2.

As illustrated in FIG. 4, the conductor layer L2 is formed on the surface of the interlayer insulating film 51 and includes the coil pattern 20 and the terminal patterns 21 and 22. The terminal patterns 21 and 22 are separated from the coil pattern 20 within the surface and overlap the terminal electrodes B1 and B2, respectively, as viewed in the z-direction. The width of the terminal pattern 21 in the x-direction is W1, and the width of the terminal pattern 22 in the x-direction is W2. The width W1 is larger than the width W2. The terminal pattern 21 is connected to the outer peripheral end 11 of the coil pattern 10 through a via conductor 61 penetrating the interlayer insulating film 51. The inner peripheral end of the coil pattern 20 is connected to the inner peripheral end of the coil pattern 10 through a via conductor 62 penetrating the interlayer insulating film 51. The thus configured conductor layer L2 is covered with the interlayer insulating film 52.

Figure 5:
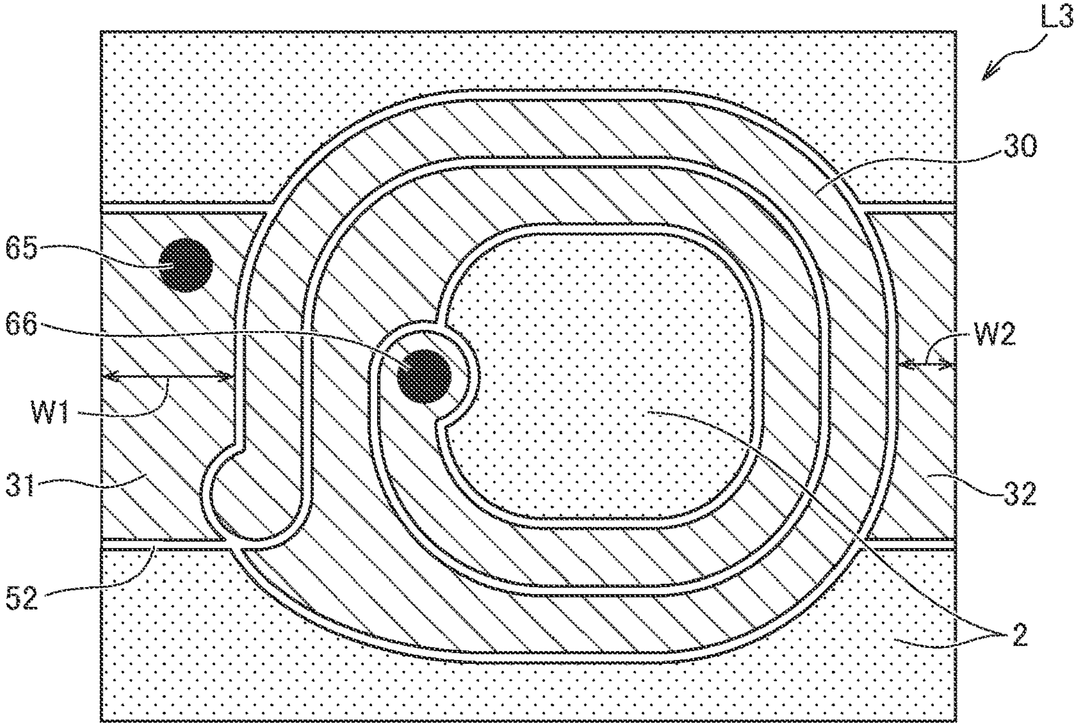
FIG. 5 is a plan view illustrating the conductor layer L3.

As illustrated in FIG. 5, the conductor layer L3 is formed on the surface of the interlayer insulating film 52 and includes the coil pattern 30 and the terminal patterns 31 and 32. The terminal patterns 31 and 32 are separated from the coil pattern 30 within the surface and overlap the terminal electrodes B1 and B2, respectively, as viewed in the z-direction. The width of the terminal pattern 31 in the x-direction is W1, and the width of the terminal pattern 32 in the x-direction is W2. The width W1 is larger than the width W2. The terminal pattern 31 is connected to the terminal pattern 21 through a via conductor 63 penetrating the interlayer insulating film 52. The plane position of the via conductor 63 differs from the plane position of the via conductor 61, thus preventing a recess of the conductor layer which may be caused due to stacking of via conductors. The outer peripheral end of the coil pattern 30 is connected to the outer peripheral end of the coil pattern 20 through a via conductor 64 penetrating the interlayer insulating film 52. The thus configured conductor layer L3 is covered with the interlayer insulating film 53.

Figure 6:
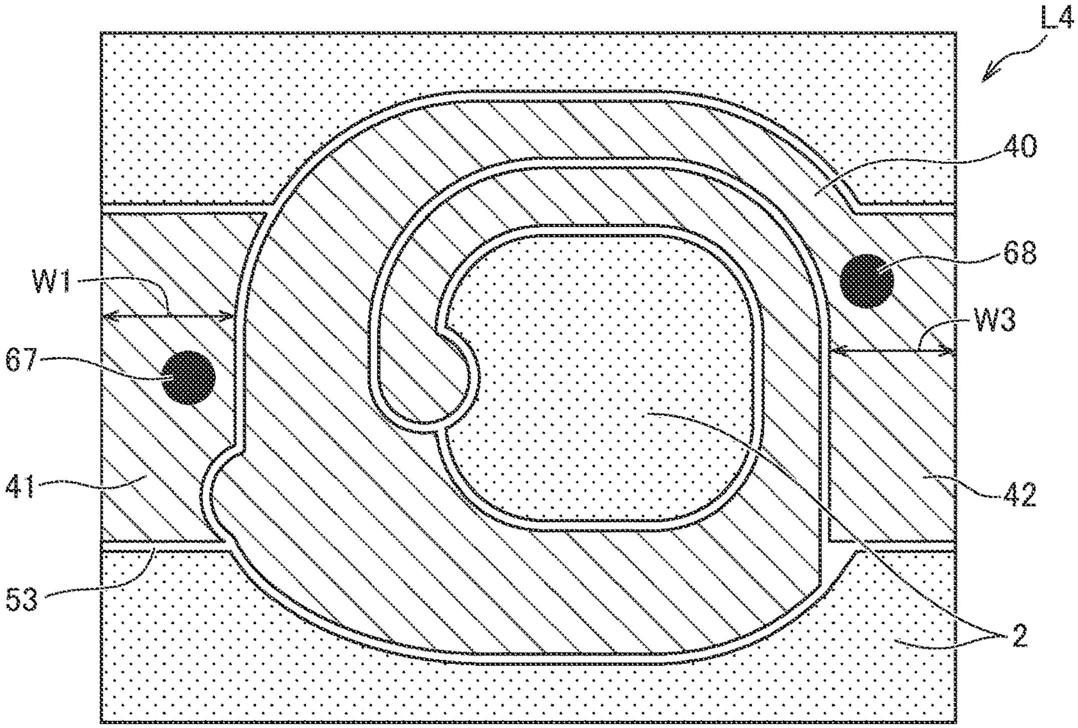
FIG. 6 is a plan view illustrating the conductor layer L4.

As illustrated in FIG. 6, the conductor layer L4 is formed on the surface of the interlayer insulating film 53 and includes the coil pattern 40 and a terminal pattern 41. An outer peripheral end 42 of the coil pattern 40 has an enlarged area and overlaps the terminal electrode B2 as viewed in the z-direction. The terminal pattern 41 is separated from the coil pattern 40 within the surface and overlaps the terminal electrode B1 as viewed in the z-direction. The width in the x-direction of the outer peripheral end 42 of the coil pattern 40 is W3, and the width in the x-direction of the terminal pattern 41 is W1. The width W3 is larger than the width W2. The terminal pattern 41 is connected to the terminal pattern 31 through a via conductor 65 penetrating the interlayer insulating film 53. The plane position of the via conductor 65 differs from the plane position of the via conductor 63, thus preventing a recess of the conductor layer which may be caused due to stacking of via conductors. The inner peripheral end of the coil pattern 40 is connected to the inner peripheral end of the coil pattern 30 through a via conductor 66 penetrating the interlayer insulating film 53. The thus configured conductor layer L4 is covered with the interlayer insulating film 54.

The bump terminal electrodes B1 and B2 are provided on the interlayer insulating film 54. The terminal electrode B1 is connected to the terminal pattern 41 through a via conductor 67 penetrating the interlayer insulating film 54. The terminal electrode B2 is connected to the outer peripheral end 42 of the coil pattern 40 through a via conductor 68 penetrating the interlayer insulating film 54. The plane position of the via conductor 67 differs from the plane position of the via conductor 65, thus preventing a recess of the conductor layer which may be caused due to stacking of via conductors. The plane size of the terminal electrode B1 is larger than those of the terminal patterns 21, 31, and 41, and the plane size of the terminal electrode B2 is larger than those of the terminal patterns 12, 22, and 32.

With the above configuration, the terminal electrode B1 is connected to the outer peripheral end 11 of the coil pattern 10 through the terminal patterns 41, 31, and 21. The outer peripheral end 11 of the coil pattern 10 and the terminal patterns 21, 31, and 41 are exposed from the side surface 2*b* of the magnetic element member 2. The terminal electrode B2 is connected to the outer peripheral end 42 of the coil pattern 40. The terminal patterns 12, 22, and 32 and the outer peripheral end 42 of the coil pattern 40 are exposed from the side surface 2*c* of the magnetic element member 2.

In the present embodiment, the width W1 of the terminal patterns 41, 31, and 21 is larger than the width W2 of the terminal patterns 32, 22, and 12, so that a resistance value between the terminal electrode B1 and the outer peripheral end 11 of the coil pattern 10 is reduced. To further reduce this resistance value, the via conductors 61, 63, 65, and 67 connecting the terminal electrode B1 and the outer peripheral end 11 may be made larger in diameter than the other via conductors 62, 64, 66, and 68. For example, when the via conductors 61, 63, 65, and 67 are made larger in diameter than the via conductor 68, a difference between a resistance value between the terminal electrode B1 and the coil pattern 10 and a resistance value between the terminal electrode B2 and the coil pattern 40 is reduced. Further, the width W1 of the terminal patterns 41, 31, and 21 is enlarged, so that even if warpage occurs in a circuit board on which the coil component 1 is mounted, stress to be applied to the via conductors 61, 63, 65, and 67 is relaxed, thereby increasing connection reliability.

In addition, a sufficient distance can be ensured between the via conductors 61, 63, 65, 67 and the side surface 2*b* in the x-direction, so that when misalignment occurs upon dicing of the coil component 1 for singulation, the via conductors 61, 63, 65, 67 are not exposed to the side surface 2*b*. The same point is valid in respect of the via conductor 68. That is, the width W3 of the outer peripheral end 42 of the coil pattern 40 is larger than the width W2 of the terminal patterns 12, 22, and 32, so that the via conductor 68 is not exposed to the side surface 2*c* upon dicing. This increases connection reliability of the via conductors.

Further, the terminal patterns 12, 22, and 32 are not connected to but isolated from one another. That is, via conductors need not be provided, so that a reduction in the width W2 can be easily achieved. This can suppress an increase in chip size due to an increase in the width in the x-direction of the outer peripheral end 11 of the coil pattern 10 and terminal patterns 21, 31, and 41. The width W2 of the terminal patterns 12, 22, and 32 may be smaller than the pattern width of each of the coil patterns 10, 20, 30, and 40. The terminal patterns 12, 22, and 32 may be omitted; however, in a case where the magnetic element member 2 is formed after formation of the bump terminal electrodes B1 and B2 in the manufacturing process of the coil component 1, the terminal patterns 12, 22, and 32 are required to be present to ensure the flatness of the outer peripheral end 42 of the coil pattern 40 serving as the underlayer of the terminal electrode B2.

Figure 7:
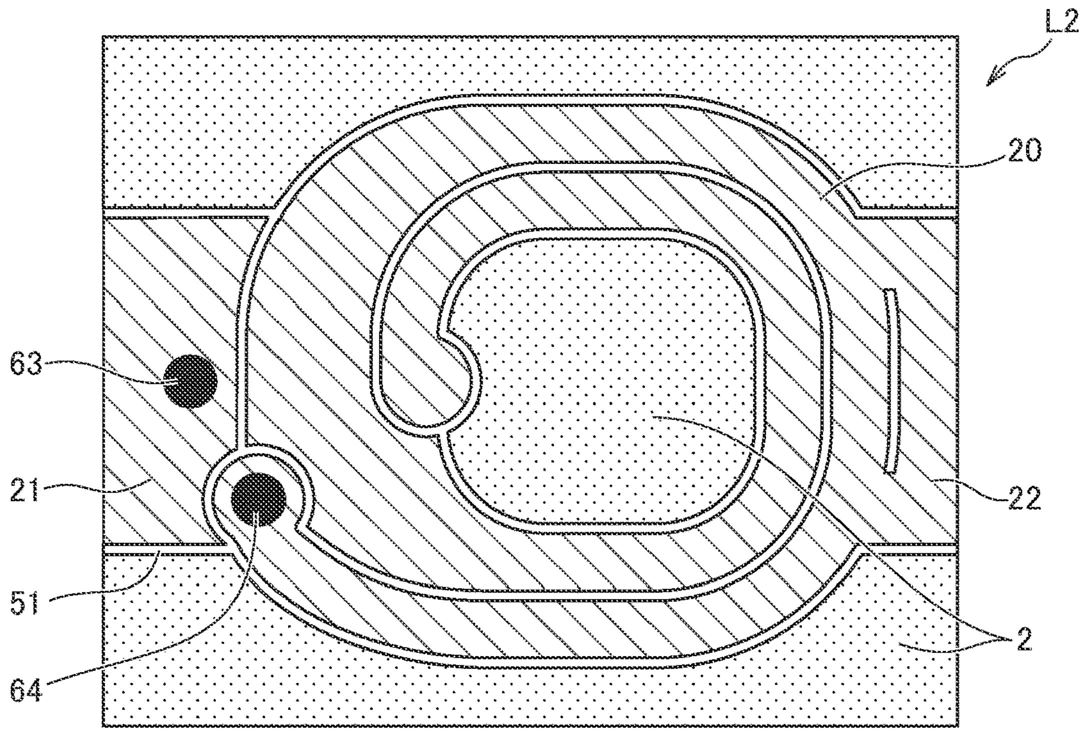
FIG. 7 is a plan view illustrating the conductor layer L2 according to a first embodiment.
Figure 8:
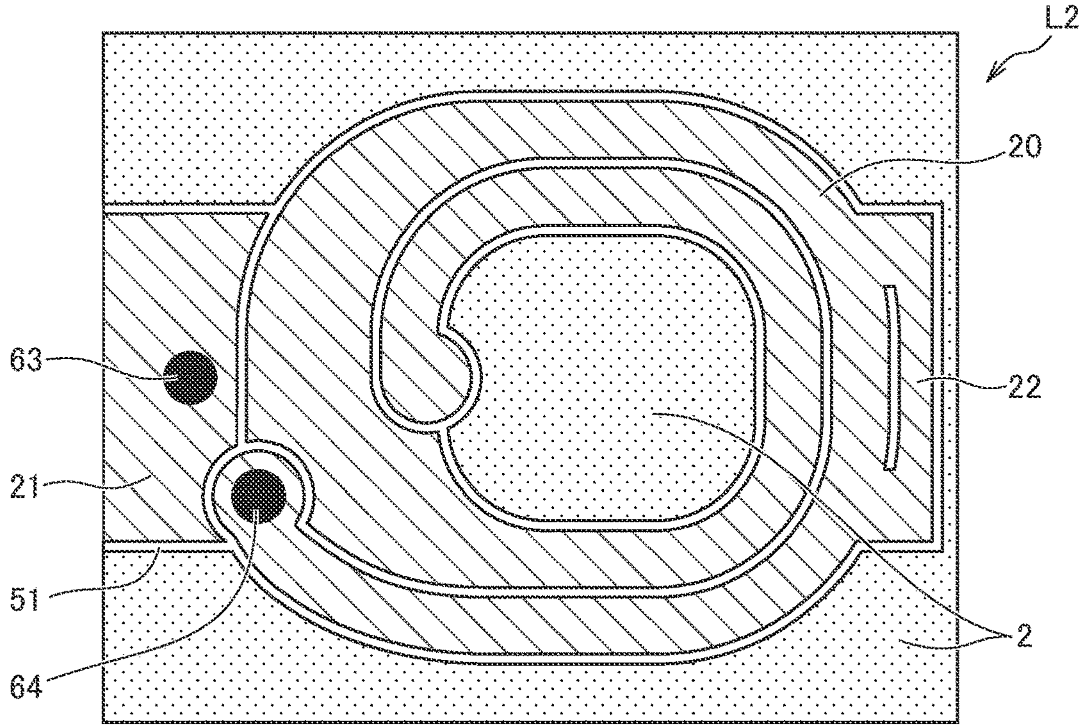
FIG. 8 is a plan view illustrating the conductor layer L2 according to a second embodiment.

The terminal patterns 12, 22, and 32 each may not necessarily be a completely independent pattern but may be connected respectively to the coil patterns 10, 20, and 30 within the respective surfaces. For example, as illustrated in FIG. 7, when both ends of the terminal pattern 22 in the y-direction are connected to the coil pattern 20, current flows also in the terminal pattern 22, thereby reducing the DC resistance of the coil part 3. Similarly, the terminal patterns 12 and 32 may be connected at their both ends to the coil patterns 10 and 30, respectively. In this case, as illustrated in FIG. 8, the terminal pattern 22 (12, 32) may not be exposed from the magnetic element member 2. This increases the volume of the magnetic element member 2 and makes a short-circuit failure due to exposure of the terminal patterns 12, 22, and 32 less likely to occur.

When the widths W0 to W3 vary depending on the position in the y-direction, they may each be defined by an average width. Further, the width W1 may not necessarily be the same among the terminal patterns 21, 31, and 41 and may vary thereamong as long as it is larger than the width W2. Similarly, the width W2 may not necessarily be the same among the terminal patterns 12, 22, and 32 and may vary thereamong as long as it is smaller than the width W1. The width W0 of the outer peripheral end 11 of the coil pattern 10 and the width 3 of the outer peripheral end 42 of the coil pattern 40 may be the same as the width W1.

While the one embodiment of the present disclosure has been described, the present disclosure is not limited to the above embodiment, and various modifications may be made within the scope of the present disclosure, and all such modifications are included in the present disclosure.

For example, although the four conductor layers L1 to l4 are stacked through the interlayer insulating films in the above embodiment, the number of conductor layers to be stacked is not limited to this, and a three-layer structure or a five or more-layer structure can be employed.

The technology according to the present disclosure includes the following configuration examples but not limited thereto.

A coil component according to the present disclosure includes: a coil part in which a plurality of interlayer insulating films and a plurality of conductor layers each having a coil pattern are alternately stacked; and first and second terminal electrodes stacked on the coil part. The plurality of conductor layers includes: a first conductor layer positioned in the lowermost layer; a second conductor layer positioned in the uppermost layer; and one or more third conductor layers positioned between the first and second conductor layers. The second and third conductor layers each include a first terminal pattern overlapping one end of the coil pattern positioned in the first conductor layer and the first terminal electrode. The first and third conductor layers each include a second terminal pattern overlapping one end of the coil pattern positioned in the second conductor layer and the second terminal electrode. The one end of the coil pattern positioned in the first conductor layer and the first terminal patterns positioned in the respective second and third conductor layers are connected to one another through via conductors penetrating the interlayer insulating films. The first terminal pattern positioned in the second conductor layer and the first terminal electrode are connected to each other through a via conductor penetrating the interlayer insulating film. The one end of the coil pattern positioned in the second conductor layer and the second terminal electrode are connected to each other through a via conductor penetrating the interlayer insulating film. The width in the radial direction of the first terminal pattern positioned in the third conductor layer is larger than the width in the radial direction of the second terminal pattern positioned in the third conductor layer.

According to the present disclosure, the first terminal pattern poisoned in the third conductor layer is enlarged in area, so that the resistance value between the one end of the coil pattern positioned in the first conductor layer and the first terminal electrode can be reduced. Further, the second terminal pattern positioned in the third conductor layer is reduced in area, so that increase in the plane size of the entire coil component can be suppressed. Furthermore, when the coil component is diced for singulation, it is possible to ensure a sufficient margin between the via conductor connected to the first terminal pattern and a dicing line.

In the present disclosure, the width in the radial direction of the one end of the coil pattern positioned in the second conductor layer may be larger than the widths in the radial direction of the second terminal patterns positioned in the respective first and third conductor layers. Thus, when the coil component is diced for singulation, it is possible to ensure a sufficient margin between the via conductors connected to the second terminal patterns and a dicing line.

In the present disclosure, the one end of the coil pattern positioned in the second conductor layer and the second terminal patterns positioned in the respective first and third conductor layers may be isolated without being connected to one another through via conductors. This eliminates the need to provide via conductors for connecting them, which in turn eliminates the need to ensure a margin between the via conductors and a dicing line.

The coil component according to the present disclosure may further include a magnetic element member embedding therein the coil part and the first and second terminal electrodes, and the first and second terminal patterns may be exposed from the magnetic element member. This improves heat dissipation performance.

As described above, according to the present disclosure, it is possible to reduce a difference between a connection resistance between one terminal electrode and its corresponding coil pattern and a connection resistance between the other terminal electrode and its corresponding coil pattern.

What is claimed is:

1. A coil component comprising:

a coil part in which a plurality of interlayer insulating films and a plurality of conductor layers each having a coil pattern are alternately stacked; and first and second terminal electrodes stacked on the coil part, wherein the plurality of conductor layers includes a first conductor layer positioned in a lowermost layer, a second conductor layer positioned in an uppermost layer, and one or more third conductor layers positioned between the first and second conductor layers, wherein each of the second and third conductor layers includes a first terminal pattern overlapping one end of the coil pattern positioned in the first conductor layer and the first terminal electrode, wherein each of the first and third conductor layers includes a second terminal pattern overlapping one end of the coil pattern positioned in the second conductor layer and the second terminal electrode, wherein the one end of the coil pattern positioned in the first conductor layer and the first terminal patterns positioned in the respective second and third conductor layers are connected to one another through via conductors penetrating the interlayer insulating films, wherein the first terminal pattern positioned in the second conductor layer and the first terminal electrode are connected to each other through a via conductor penetrating the interlayer insulating film, wherein the one end of the coil pattern positioned in the second conductor layer and the second terminal electrode are connected to each other through a via conductor penetrating the interlayer insulating film, and wherein a width along a first imaginary straight line extending in a radial direction of the first terminal pattern positioned in the third conductor layer is larger than a width along the first imaginary straight line of the second terminal pattern positioned in the third conductor layer.

2. The coil component as claimed in claim 1, wherein a width along a second imaginary straight line extending in the radial direction of the one end of the coil pattern positioned in the second conductor layer is larger than the width along the first imaginary straight line of the second terminal pattern positioned in the third conductor layer.

3. The coil component as claimed in claim 1, wherein the one end of the coil pattern positioned in the second conductor layer and the second terminal patterns positioned in the respective first and third conductor layers are isolated without being connected to one another through via conductors.

4. The coil component as claimed in claim 1, further comprising a magnetic element member embedding therein the coil part and the first and second terminal electrodes, wherein the first and second terminal patterns are exposed from the magnetic element member.

5. The coil component as claimed in claim 2, wherein the second imaginary straight line extends in a same direction as the first imaginary straight line.

6. The coil component as claimed in claim 2, wherein the width along the second imaginary straight line of the one end of the coil pattern positioned in the second conductor layer is larger than a width along a third imaginary straight line extending in the radial direction of the second terminal pattern positioned in the first conductor layer.

7. The coil component as claimed in claim 6, wherein the third imaginary straight line extends in a same direction as each of the first and second imaginary straight lines.

8. A coil component comprising:

a first conductor layer including a first coil pattern having first and second ends;

a second conductor layer including a second coil pattern having third and fourth ends and first and second additional patterns;

a third conductor layer including a third coil pattern having a fifth end and a third additional pattern;

a first interlayer insulating film positioned between the first and second conductor layers;

a second interlayer insulating film positioned between the second and third conductor layers;

a first via conductor embedded in the first interlayer insulating film so as to be connected between the first end of the first coil pattern and the first additional pattern;

a second via conductor embedded in the first interlayer insulating film so as to be connected between the second end of the first coil pattern and the third end of the second coil pattern;

a third via conductor embedded in the second interlayer insulating film so as to be connected between the first additional pattern and the third additional pattern; and a fourth via conductor embedded in the second interlayer insulating film so as to be connected between the fourth end of the second coil pattern and the fifth end of the third coil pattern, wherein the second coil pattern is sandwiched between the first and second additional patterns in a first direction, and wherein the first additional pattern is larger in width in the first direction than the second additional pattern.

9. The coil component as claimed in claim 8, wherein a maximum width of the first additional pattern in the first direction is larger than a maximum width of the second additional pattern in the first direction.

10. The coil component as claimed in claim 8, wherein a minimum width of the first additional pattern in the first direction is larger than a minimum width of the second additional pattern in the first direction.

11. The coil component as claimed in claim 8, wherein a width of the first additional pattern along a first imaginary straight line extending in the first direction is larger than a width of the second additional pattern along the first imaginary straight line.

12. The coil component as claimed in claim 11, wherein the first imaginary straight line passes a coil axis of the second coil pattern.

13. The coil component as claimed in claim 8, wherein the third conductor layer further includes a fourth additional pattern, wherein the third coil pattern is sandwiched between the third and fourth additional patterns in the first direction, and wherein the third additional pattern is larger in width in the first direction than the fourth additional pattern.

14. The coil component as claimed in claim 13, wherein the first additional pattern is larger in width in the first direction than the fourth additional pattern.

15. The coil component as claimed in claim 13, wherein the third additional pattern is larger in width in the first direction than the second additional pattern.

16. The coil component as claimed in claim 13, further comprising:

a fourth conductor layer including a fourth coil pattern and a fifth additional pattern;

a third interlayer insulating film positioned between the third and fourth conductor layers; and fifth and sixth via conductors embedded in the third interlayer insulating film, wherein the third coil pattern further has a sixth end, wherein the fourth coil pattern has seventh and eighth ends, wherein the fifth via conductor is connected between the third additional pattern and the fifth additional pattern, and wherein the sixth via conductor is connected between the sixth end of the third coil pattern and the seventh end of the fourth coil pattern.

17. The coil component as claimed in claim 16, wherein the fifth additional pattern is larger in width in the first direction than each of the second and fourth additional patterns.

18. The coil component as claimed in claim 16, wherein the eighth end of the fourth coil pattern is larger in width in the first direction than each of the second and fourth additional patterns.

19. The coil component as claimed in claim 8, further comprising a magnetic element member embedding therein the first, second, and third conductor layers, wherein the first and third additional patterns are exposed from a first surface of the magnetic element member.

20. The coil component as claimed in claim 19, wherein the second and fourth additional patterns are exposed from a second surface of the magnetic element member.

* * * * *